(12) United States Patent
Piovano et al.

(10) Patent No.: US 7,889,941 B2
(45) Date of Patent: Feb. 15, 2011

(54) EFFICIENT SEGMENTATION OF PIECEWISE SMOOTH IMAGES

(75) Inventors: Jerome Piovano, Juan les Pains (FR); Mikael Rousson, Trenton, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 985 days.

(21) Appl. No.: 11/696,869

(22) Filed: Apr. 5, 2007

(65) Prior Publication Data

US 2008/0107351 A1    May 8, 2008

Related U.S. Application Data

(60) Provisional application No. 60/857,295, filed on Nov. 7, 2006.

(51) Int. Cl.
    *G06K 9/44* (2006.01)
(52) U.S. Cl. .................. 382/260; 382/266; 382/173; 382/171; 382/164
(58) Field of Classification Search .......... 382/260, 382/261, 262, 263, 264, 265, 266, 274, 173, 382/164, 171, 174
    See application file for complete search history.

(56) References Cited

U.S. PATENT DOCUMENTS

| | | | |
|---|---|---|---|
| 6,208,138 B1* | 3/2001 | Lai et al. | 324/307 |
| 2002/0035323 A1* | 3/2002 | Saha et al. | 600/410 |
| 2006/0039623 A1* | 2/2006 | Chaudhury et al. | 382/266 |
| 2006/0233455 A1* | 10/2006 | Cheng et al. | 382/274 |
| 2007/0031003 A1* | 2/2007 | Cremers | 382/103 |
| 2007/0160309 A1* | 7/2007 | Bertozzi et al. | 382/266 |
| 2007/0165966 A1* | 7/2007 | Weiss et al. | 382/284 |
| 2007/0211940 A1* | 9/2007 | Fluck et al. | 382/173 |

OTHER PUBLICATIONS

G. Aubert, et al. Image segmentation using active contours: Calculus of variations or shape gradients. *SIAM Journal of Applied Mathematics*, 63(6):2128-2154, 2003.
V. Caselles, et al. Geodesic active contours. *International Journal of Computer Vision*, vol. 22:61-79, 1997.
D. Cremers, et al. A review of statistical approaches to level set segmentation: integrating color, texture, motion and shape. *International Journal of Computer Vision*, 2006.
O. Juan, et al. Stochastic motion and the level set method in computer vision: Stochastic active contours. *The International Journal of Computer Vision*, 69(1):7-25, 2006.
S. Kichenassamy, et al. Gradient flows and geometric active contour models. In *Proceedings of the 5th International Conference on Computer Vision*, pp. 810-815, Boston, MA, Jun. 1995. IEEE Computer Society Press.

(Continued)

*Primary Examiner*—Samir A Ahmed
*Assistant Examiner*—Ali Bayat
(74) *Attorney, Agent, or Firm*—Donald B. Paschburg

(57) ABSTRACT

A fast and robust segmentation model for piecewise smooth images is provided. Local statistics in an energy formulation are provided as a functional. The shape gradient of this new functional gives a contour evolution controlled by local averaging of image intensities inside and outside the contour. Fast computation is realized by expressing terms as the result of convolutions implemented via recursive filters. Results are similar to the general Mumford-Shah model but realized faster without having to solve a Poisson partial differential equation at each iteration. Examples are provided. A system to implement segmentation methods is also provided.

20 Claims, 8 Drawing Sheets

OTHER PUBLICATIONS

J. Kim, et al. Nonparametric methods for image segmentation using information theory and curve evolution. In *IEEE International Conference on Image Processing*, pp. 797-800, Sep. 2002.

D. Mumford et al. Optimal approximations by piecewise smooth functions and associated variational problems. *Comm. Pure Appl. Math.*, 42: 577-685, 1989.

S. Osher et al. Fronts propagation with curvature dependent speed: Algorithms based on Hamilton-Jacobi formulations. *J. of Comp. Phys.*, 79:12-49, 1988.

N. Paragios et al. Geodesic active regions and level set methods for supervised texture segmentation. *The International Journal of Computer Vision*, 46(3):223-247, 2002.

M. Rousson et al. A variational framework for active and adaptative segmentation of vector valued images. In *Proc. IEEE Workshop on Motion and Video Computing*, pp. 56-62, Orlando, Florida, Dec. 2002.

A. Tsai, et al. Curve evolution implementation of the mumford-shah functional for image segmentation, denoising, interpolation, and magnification. *IEEE Transactions on Image Processing*, 10(8):1169-1186, Aug. 2001.

L. Vese. Multiphase object detection and image segmentation. In S. Osher and N. Paragios, editors, *Geometric Level Set Methods in Imaging, Vision and Graphics*, pp. 175-194. Springer Verlag, 2003.

L. Vese et al. A multiphase level set framework for image segmentation using the mumford and shah model. *International Journal of Computer Vision*, 50:271-293, 2002.

* cited by examiner 101 102 103

201 202

EFFICIENT SEGMENTATION OF PIECEWISE SMOOTH IMAGES

CROSS-REFERENCE TO RELATED APPLICATIONS

This application claims the benefit of U.S. Provisional Application No. 60/857,295 filed Nov. 7, 2006, which is incorporated herein by reference.

BACKGROUND OF THE INVENTION

The present invention relates to image segmentation. In particular it relates to efficient segmentation of images with smooth intensity regions.

The extraction of piecewise smooth regions from an image is of great interest in different domains, and still remains a challenging task. For example, this is very useful in medical imaging where organs or structures of interest are often characterized by smooth intensity regions. This problem has been formulated as the minimization of an energy by Mumford and Shah in: D. Mumford and J. Shah. Optimal approximations by piecewise smooth functions and associated variational problems. *Comm. Pure Appl. Math.*, 42:577-685, 1989 as:

$$E^{MS}(u, \Gamma) = \mu^2 \int_\Omega (u_0 - u)^2 dx + \int_{\Omega \setminus \Gamma} |\nabla u|^2 dx + v|\Gamma| \quad (1)$$

where u is the piecewise smooth function, $\Gamma$ is the interface between smooth regions, and $u_0$ is the original image. The interpretation of the three terms is straightforward: the first one is the usual mean-square data term; the second one means that one wants to extract smooth regions; the third one means that one want to extract regions with smooth boundaries.

The minimizer of this so-called Mumford-Shah functional gives a boundary that separates the image domain in smooth regions. A very interesting property of this approach is that it solves two common image-processing tasks simultaneously: image denoising and image segmentation. However, finding the minimizer is not straightforward and remains an issue. Being non-convex, the functional is most of the time minimized using gradient descent techniques which are subject to local minima. For example, in "L. Vese and T. Chan. A multiphase level set framework for image segmentation using the mumford and shah model. *International Journal of Computer Vision*, 50:271-293, 2002" and "A. Tsai, A. Jr. Yezzi, and A. S. Willsky. Curve evolution implementation of the mumford-shah functional for image segmentation, denoising, interpolation, and magnification. *IEEE Transactions on Image Processing*, 10(8):1169-1186, August 2001", the optimization process alternates between the evolution of one or two level set functions such as provided in "S. Osher and J. Sethian. Fronts propagation with curvature dependent speed: Algorithms based on Hamilton-Jacobi formulations. *J. of Comp. Phys.*, 79:12-49, 1988", "J. Sethian. *Level Set Methods and Fast Marching Methods: Evolving Interfaces in Computational Geometry, Fluid Mechanics, Computer Vision, and Materials Sciences.* Cambridge Monograph on Applied and Computational Mathematics. Cambridge University Press, 1999" and "A. Dervieux and F. Thomasset. A finite element method for the simulation of Raleigh-Taylor instability. *Springer Lect. Notes in Math.*, 771:145-158, 1979" and the resolution of Poison partial differential equations. This process is computational extensive and requires a very good initialization to avoid being stuck into local minima.

To relax this problem, one can consider a restriction of $E^{MS}$ to piecewise constant functions. Let $\Omega_i$ be the open subsets delimited by $\Gamma$, the piecewise constant Mumford-Shah functional writes:

$$E_0^{MS}(\Gamma) = \sum_i \int_{\Omega_i} (u_0 - mean_{\Omega_i}(u_0))^2 dx + v|\Gamma| \quad (2)$$

This functional was shown in "D. Mumford and J. Shah. Optimal approximations by piecewise smooth functions and associated variational problems. *Comm. Pure Appl. Math.*, 42:577-685, 1989" to be a limit functional of expression (1) as $\mu \to 0$. A level set implementation of this functional known as the Chan and Vese model was proposed in "L. Vese and T. Chan. A multiphase level set framework for image segmentation using the mumford and shah model. *International Journal of Computer Vision*, 50:271-293, 2002". While this simplified functional is easier to minimize, it also makes a very strong assumption on the image by assuming implicitly a Gaussian intensity distribution for each region $\Omega_i$ as described in "M. Rousson and R. Deriche. A variational framework for active and adaptative segmentation of vector valued images. In *Proc. IEEE Workshop on Motion and Video Computing*, pages 56-62, Orlando, Fla., December 2002". Other papers model this distribution with Gaussian mixtures such as in "N. Paragios and R. Deriche. Geodesic active regions and level set methods for supervised texture segmentation. *The International Journal of Computer Vision*, 46(3): 223-247, 2002" and "0. Juan, R. Keriven, and G. Postelnicu. Stochastic motion and the level set method in computer vision: Stochastic active contours. *The International Journal of Computer Vision*, 69(1):7-25, 2006", or with nonparametric distributions such as "J. Kim, J. Fisher, A. Yezzi, M. Cetin, and A. Willsky. Nonparametric methods for image segmentation using information theory and curve evolution, in *IEEE International Conference on Image Processing*, pages 797-800, September 2002", but they all make the assumption of a global distribution over each region. In many real images, these global intensity models are not valid. This is often the case in medical imaging, especially in MR images where an intensity bias can be observed.

Several approaches are available to overcome the limitation of global techniques. One is to consider image gradients by fitting the contour to image discontinuities. This is generally referred to as edge-based methods, and it is the basis of the Geodesic Active Contours as described in "V. Caselles, R. Kimmel, and G. Sapiro. Geodesic active contours. *International Journal of Computer Vision*, Vol 22:61-79, 1997" and "S. Kichenassamy, A. Kumar, P. Olver, A. Tannenbaum, and A. Yezzi. Gradient flows and geometric active contour models. In *Proceedings of the 5th International Conference on Computer Vision*, pages 810-815, Boston, Mass., June 1995. IEEE Computer Society Press". A third functional was also introduced in the seminal work of Mumford and Shah: "D. Mumford and J. Shah. Optimal approximations by piecewise smooth functions and associated variational problems. *Comm. Pure Appl. Math.*, 42: 577-685, 1989". This functional is the integral along Γ of a generalized Finsler metric and leads indeed to the first geodesic active contour (before "V. Caselles, R. Kimmel, and G. Sapiro. Geodesic active contours. *International Journal of Computer Vision*, Vol 22:61-79, 1997" and "S. Kichenassamy, A. Kumar, P. Olver, A. Tannenbaum, and A. Yezzi. Gradient flows and geometric active contour models. In *Proceedings of the 5th International Conference on Computer Vision*, pages 810-815, Boston, Mass., June 1995. IEEE Computer Society Press".).

Edge-based methods are also well-known for their high sensitivity to noise and for the presence of local minima in the optimization as described in D. Cremers, M. Rousson, and R. Deriche. A review of statistical approaches to level set segmentation: integrating color, texture, motion and shape. *International Journal of Computer Vision,* 2006. Another alternative was briefly discussed in "L. Vese. Multiphase object detection and image segmentation, in S. Osher and N. Paragios, editors, *Geometric Level Set Methods in Imaging, Vision and Graphics*, pages 175-194. Springer Verlag, 2003" where the function $u_0$ of the Mumford-Shah functional is restricted to a linear function of the spatial location x: $u_0(x)=a.x+b$. Even though this last one is promising, it is still restricted to very particular spatial distributions of the intensity.

Accordingly methods and systems for extracting piecewise smooth regions but with improved performance are required.

SUMMARY OF THE INVENTION

In accordance with one aspect of the present invention a novel method and system are provided for an improved segmentation of an image object from a background.

In accordance with another aspect of the present invention a method is provided for segmentation of an image $u_0$ comprising the steps of creating a plurality of smooth regions $\Omega_i$ delimited by a boundary $\Gamma$; approximating the image by a piecewise smooth function $u_\sigma$ inside each region $\Omega_i$; and evaluating a functional.

In accordance with a further aspect of the present invention a method is provided wherein the piecewise smooth function is expressed as:

$$u_\sigma(x, \Omega_i) = \frac{\int_{\Omega_i} g_\sigma(x-y) u_0(y) dy}{\int_{\Omega_i} g_\sigma(x-y) dy},$$

wherein $g_\sigma(v) = \frac{1}{\sqrt{2\pi}\sigma} \exp\left(-\frac{v^2}{2\sigma^2}\right)$ is a Gaussian kernel.

In accordance with another aspect of the present invention a method is provided wherein the functional is expressed as $E(\Gamma) = \mu^2 \int_S (u_0 - u_\sigma(\Gamma))^2 dx + v|\Gamma|$.

In accordance with a further aspect of the present invention a method is provided wherein the functional is expressed as $$E(\Gamma) = \mu^2 \sum_i \int_{\Omega_i} (u_0 - u_\sigma(\Omega_i))^2 dx + v|\Gamma|.$$

In accordance with another aspect of the present invention a method is provided wherein $u_\sigma$ represents an overall piecewise smooth approximation expressed as $$u_\sigma(x, \Gamma) = \sum_i \chi_i u_\sigma(x, \Omega_i).$$

In accordance with a further aspect of the present invention a method is provided wherein a performance of segmentation can be tuned by selecting a value of $\sigma$.

In accordance with another aspect of the present invention a method is provided wherein the segmentation is a bi-partitioning, separating a region $\Omega$ from a complementary region $\overline{\Omega}$.

In accordance with a further aspect of the present invention a method is provided further comprising: evolving the boundary $\Gamma$ between region $\Omega$ and region $\overline{\Omega}$ according to an expression:

$$\frac{\partial \Gamma}{\partial t}(x) = \left[\mu^2\left((u_0(x)-u_\sigma(x,\overline{\Omega}))^2 - (u_0(x)-u_\sigma(x,\Omega))^2 - q_\sigma(x,\overline{\Omega}) + q_\sigma\right)\right] + v\kappa]N(x).$$

In accordance with another aspect of the present invention a method is provided further comprising: implementing the evolving of the boundary $\Gamma$ with a level set representation.

In accordance with a further aspect of the present invention a method is provided further comprising computing steps of the evolving of the boundary $\Gamma$ with a recursive filter.

In accordance with another aspect of the present invention a system is provided which can perform and execute the steps of the methods here provided as aspects of the present invention.

DESCRIPTION OF A PREFERRED EMBODIMENT

As an aspect of the present invention a general approach for extracting piecewise smooth regions is disclosed. Instead of minimizing the distance between the intensity and the average intensity of the region like in expression (2), the distance between the intensity and local averaging inside the region is minimized. This gives a model able to approximate piecewise smooth functions like the original Mumford-Shah functional provided in expression (1), but with a complexity closer to that of the piecewise constant model.

The model here provided as another aspect of the present invention will be explained in detail and how it can be linked to the Mumford-Shah model. The minimized energy as well as its derivative using the shape gradient are expressed. The level set method is used to compute the evolution of the interface, and each term of the derivative is expressed as the result of a convolution as a further aspect of the present invention. The importance of the fast recursive filter is briefly explained. Some results on synthetic and real data will be provided and compared with the piecewise smooth and piecewise constant Mumford-Shah Model.

Piecewise Smooth Approximation Through Gaussian Convolutions

The Mumford-Shah model approximates the image by a piecewise smooth function by penalizing the high gradient of an "ideal" cartoon image (u in expression (1)). Making an estimation of this image at the same time as the segmentation makes the functional difficult to minimize, and computationally expensive, as it is the solution of a poisson equation.

Herein the problem is approached differently by fixing the cartoon image to a smoothing of the image intensity inside each subset $\Omega_i$ for the 2 Dimensional case, the smooth function in $\Omega_i$ is then defined as, $$u_\sigma(x, \Omega_i) = \frac{\int_{\Omega_i} g_\sigma(x-y) u_0(y) dy}{\int_{\Omega_i} g_\sigma(x-y) dy}, \quad (3)$$

$$\text{wherein } g_\sigma(v) = \frac{1}{\sqrt{2\pi}\sigma} \exp\left(-\frac{v^2}{2\sigma^2}\right)$$

Figure 1:
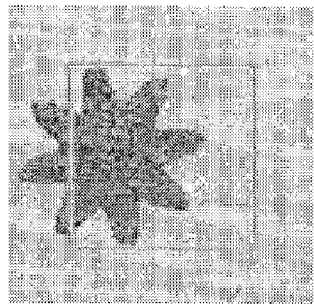
FIG. 1 shows an original image and smoothed versions of that image.
Figure 1:
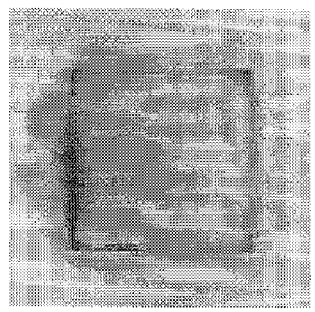
Figure 1:
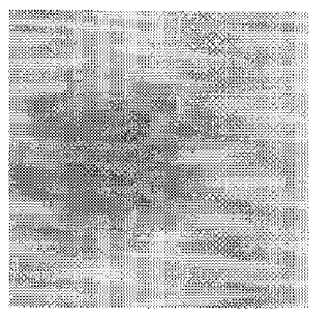

The denominator of this expression is a normalization factor which is important for voxels that are close to the border of $\Omega_i$, i.e. when the Gaussian kernel does not overlap completely with $\Omega_i$. This can be also interpreted as a local weighted averaging of the image intensity around the voxel x inside the region $\Omega_i$. This is demonstrated in FIG. 1. It shows the importance of the denominator in the formulation of smooth regions. Image 101 in FIG. 1 is the original image; image 102 and image 103 in FIG. 1 are smoothed approximations of the image 101 wherein 102 and 103 are the piecewise smooth images estimated by the model which is an aspect of the present invention, for a given position of the boundary. Estimate 102 is an approximation without the normalization factor and 103 is an approximation with the normalization factor.

Let $x_i$ be a characteristic function of $\Omega_i$ such that $x_i(x)=1$ if $x \in \Omega_i$ and 0 otherwise. One can express the overall piecewise smooth approximation of the image as $$u_\sigma(x, \Gamma) = \sum_i \chi_i u_\sigma(x, \Omega_i) \quad (4)$$

With this approximation, u is a piecewise smooth function that is given analytically with respect to the boundary $\Gamma$, and one does not need anymore the regularization term on u present in expression (1). This leads to a new functional:

$$E(\Gamma) = \mu^2 \int_S (u_0 - u_\sigma(\Gamma))^2 dx + \nu|\Gamma| \quad (5)$$

$$= \mu^2 \sum_i \int_{\Omega_i} (u_0 - u_\sigma(\Omega_i))^2 dx + \nu|\Gamma|$$

Figure 2:
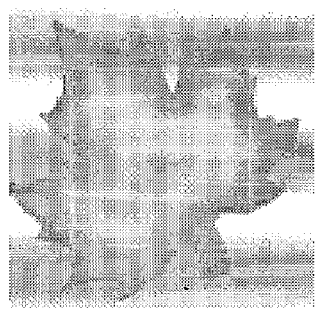
FIG. 2 shows an original image with segmentation initialization and a segmented image.
Figure 2:
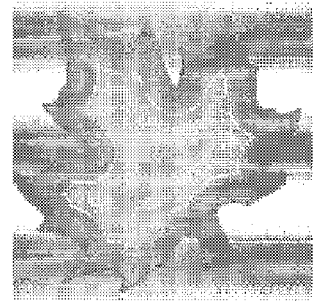

Interestingly, when the variance $\sigma$ of the Gaussian goes to infinity, this functional becomes equivalent to the piecewise constant model. This limit model has become very popular in its level set formulation (Chan-Vese model as described in L. Vese and T. Chan. A multiphase level set framework for image segmentation using the mumford and shah model. *International Journal of Computer Vision*, 50:271-293, 2002) because it performs very well for regions that are characterized by quite different global means. However it is not able to discriminate regions with nearly the same global intensity distributions as is shown in FIG. 2. FIG. 2 is an example of an image that does not suit the Chan-Vese model. Image 201 of FIG. 2 shows the initialization and image 202 the convergence. With a different choice of $\sigma$, the model here presented becomes more local and can segment a wider set of images where image regions differ only in their local intensity distributions. Hence, tuning the parameter $\sigma$ permits to control the locality of intensity statistics inside each region.

Although the model here presented has no restriction on the number of regions to segment, in the following the focus is on the bi-partitioning case to make the explanations simpler. In particular, this allows to represent the boundary $\Gamma$ with a single level set function. Several extensions using multiple level set functions have been proposed to segment an arbitrary number of regions as described in "L. Vese and T. Chan. A multiphase level set framework for image segmentation using the mumford and shah model. *International Journal of Computer Vision*, 50:271-293, 2002".

Energy Minimization

In the case of bi-partitioning, the contour $\Gamma$ separates a region $\Omega$ from its complementary $\bar{\Omega}$, and the energy (5) becomes:

$$E(\Gamma) = \mu^2 \sum_{D=\{\Omega,\bar{\Omega}\}} \int_D \left( u_0(x) - \frac{\int_D g_\sigma(x-y) u_0(y) dy}{\int_D g_\sigma(x-y) dy} \right) dx + \nu|\Gamma| \quad (6)$$

To minimize this energy, one can use the shape gradient tools developed in "G. Aubert, M. Barlaud, O. Faugeras, and S. Jehan-Besson. Image segmentation using active contours: Calculus of variations or shape gradients? *SIAM Journal of Applied Mathematics*, 63(6):2128-2154, 2003". The detailed derivation is presented in a later section of the disclosure. It leads to the following evolution on the boundary $\Gamma$:

$$\frac{\partial \Gamma}{\partial t}(x) = [\mu^2((u_0(x) - u_\sigma(x, \bar{\Omega}))^2 - \quad (7)$$

$$(u_0(x) - u_\sigma(x, \Omega))^2 - q_\sigma(x, \bar{\Omega}) + q_\sigma(x, \Omega)) + \nu\kappa]N(x),$$

with $$q_\sigma(x, \Omega) = \int_\Omega \frac{2(u_0(y) - u_\sigma(u, \Omega))(u_0(x) - u_\sigma(y, \Omega))g_\sigma(y-x)}{\int_\Omega g_\sigma(y-z) dz} dy.$$

Where N(x) is the outward normal vector to $\Gamma$ at the point x. The first two terms of this evolution equation are similar to the ones that can be found in the usual piecewise smooth and constant Mumford-Shah cases. Their interpretation is quite straightforward: the contour will locally move to include the current image voxel in the region it is the most similar to. The other terms are unique to the formulation provided here as an aspect of the present invention and come from the analytical expression of the piecewise smooth image as a function of the boundary.

Level Set Implementation

Any curve representation can be used to implement the evolution described in expression (7). Here it is presented how to do this with a level set representation. In particular, this allows giving an implementation that is valid in any dimension. Any curve representation can be used to implement the evolution described in expression (7). Here it is presented how to do it with a level set representation. In particular, this allows to give an implementation that is valid in any dimension.

Let $\phi$ be the signed distance function to the boundary $\Gamma$, positive in $\Omega$ and negative in $\overline{\Omega}$. $H_\alpha$ is here introduced as the regularized versions of the Heaviside functions. Equation (7) becomes:

$$\frac{\partial \phi}{\partial t} = |\nabla \phi| \left[ \mu^2 \left( (u_0(x) - u_\sigma(x, \overline{\Omega}))^2 - (u_0(x) - u_\sigma(x, \Omega))^2 - q_\sigma(x, \overline{\Omega}) \right) + q_\sigma(x, \Omega) \right) + \nu \kappa \right] \quad (8)$$

where all four different terms $u_\sigma(\phi), \overline{u}_\sigma(\phi), q_\sigma(\phi)$ and $\overline{q}_\sigma(\phi)$ can be computed with convolutions by the Gaussian kernel $g_\sigma$:

$$\begin{cases} u_\sigma(\phi) = \dfrac{g_\sigma * H_\alpha(\phi) u_0}{g_\sigma * H_\alpha(\phi)} \\ \overline{u}_\sigma(\phi) = \dfrac{g_\sigma * (1 - H_\alpha(\phi)) u_0}{g_\sigma * (1 - H_\alpha(\phi))} \\ q_\sigma(\phi) = u_0 \left( g_\sigma * \dfrac{2(u_0 - u_\sigma)}{g_\sigma * H_\alpha(\phi)} \right) - g_\sigma * \dfrac{2(u_0 - u_\sigma) u_\sigma}{g_\sigma * H_\alpha(\phi)} \\ \overline{q}_\sigma(\phi) = u_0 \left( g_\sigma * \dfrac{2(u_0 - \overline{u}_\sigma)}{g_\sigma * (1 - H_\alpha(\phi))} \right) - g_\sigma * \dfrac{2(u_0 - \overline{u}_\sigma) \overline{u}_\sigma}{g_\sigma * (1 - H_\alpha(\phi))} \end{cases} \quad (9)$$

Each one of these terms need to be updated at each evolution of the level set. Even though these expressions seem complicated, their estimation is quite straightforward since they are the results of convolutions by a Gaussian kernel (more details are provided in a later section). This is a good advantage because it can be implemented very effectively with a recursive filter as described in "R. Deriche. Using Canny's criteria to derive a recursively implemented optimal edge detector. *The International Journal of Computer Vision*, 1(2):167-187, May 1987". Hence, for a d dimensional image with N voxels, the complexity of each convolution is in O(d. N), only six convolutions are needed to compute the four terms. If one compares this complexity to the piecewise constant case, where the means inside each region also need to be recomputed at each iteration, it is of the same order.

Results and Comparisons

Figure 3:
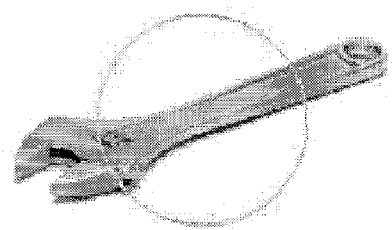
FIG. 3 shows an image with a segmentation initialization.
Figure 4:
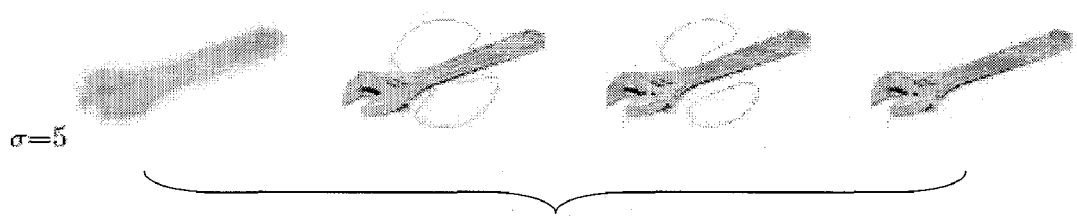
FIG. 4. shows segmentation of the image of FIG. 3 in accordance with an aspect of the present invention.
Figure 5:
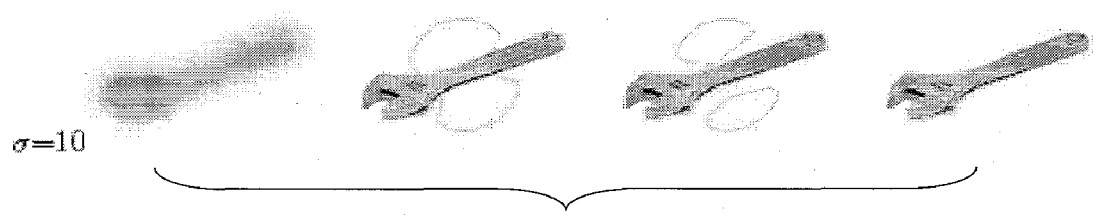
FIG. 5. shows another segmentation of the image of FIG. 3 in accordance with an aspect of the present invention.
Figure 6:
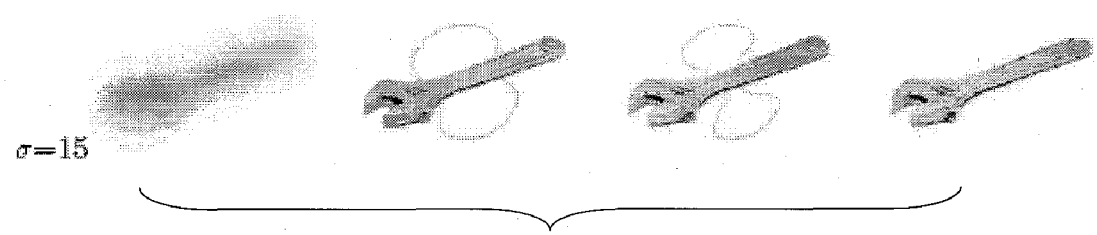
FIG. 6 shows yet another segmentation of the image of FIG. 3 in accordance with an aspect of the present invention.

The model provided as an aspect of the present invention is demonstrated by applying it on several images. FIG. 3 shows the initialization of an image. FIGS. 4-6 show the role of the variance $\sigma$ in evolution: a small variance extracts thinner details, whereas a large variance suits well for large homogeneous shape. As pointed out earlier, when $\sigma$ goes to infinity, the functional become equivalent to the Chan-Vese model. However, for small variances, the initial contour has to be close to edges to evolve, but are able to extract much thinner details. Actually, the model behaves like the geodesic active contour model without any balloon force: it drives the front toward edges in the image, and makes it evolve via a mean curvature flow in homogeneous regions. More generally, the evolution of the front "follows" the edges that cross the initial contour. The model is thus very dependent on the initialization.

Figure 7:
FIG. 7 shows an image with a segmentation initialization.
Figure 8:
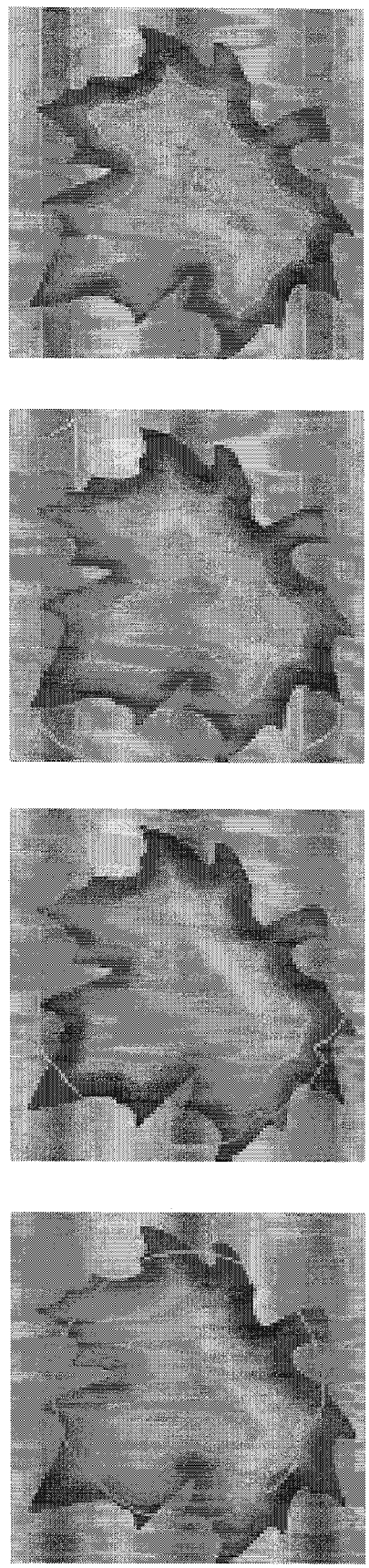
FIG. 8 shows a segmentation of the image of FIG. 7.
Figure 9:
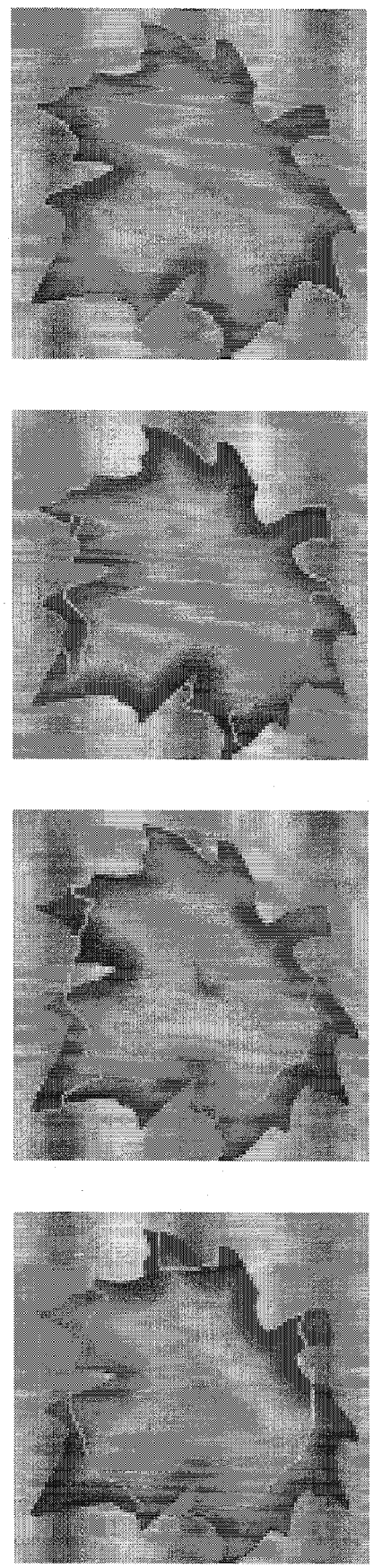
FIG. 9 shows a segmentation of the image of FIG. 7 in accordance with an aspect of the present invention.

FIGS. 7-9 demonstrate an aspect of the present invention. FIG. 7 shows the initialization of the segmentation of a leaf object. The object in FIG. 7 has two distinct regions characterized by the same global statistics. FIG. 8 shows the segmentation using the Chan-Vese model. In FIG. 8, one can point out the limitations of the Chan-Vese model that separates the white regions from the black, also in the background, and does not extract accurately the leaf in the image. FIG. 9 shows a segmentation of the leaf object in accordance with an aspect of the present invention. One can see in FIG. 9 that the segmentation model here provided model behaves quite well. One can clearly see that the front "follows" the edges that crossed it in its initial shape.

Figure 10:
FIG. 10 illustrates a segmentation of an object in a medical image.
Figure 10:
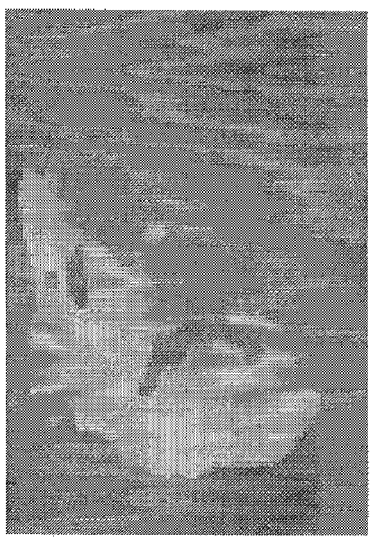
Figure 10:
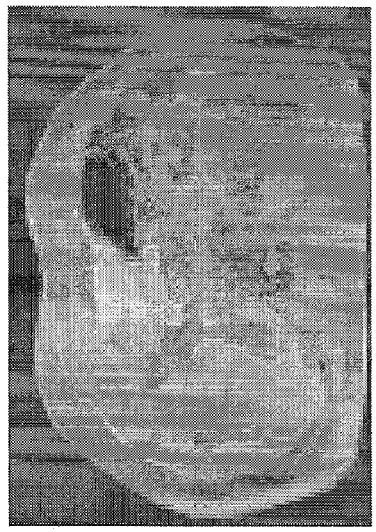
Figure 10:
Figure 10:
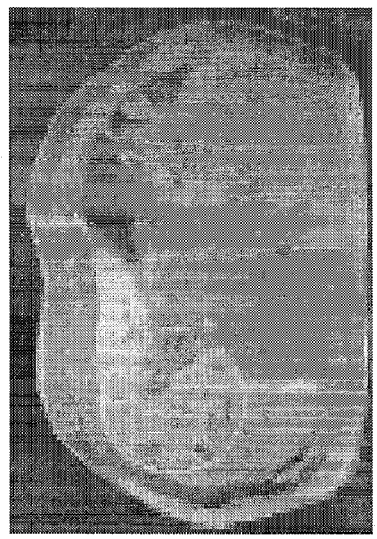
Figure 10:
Figure 11:
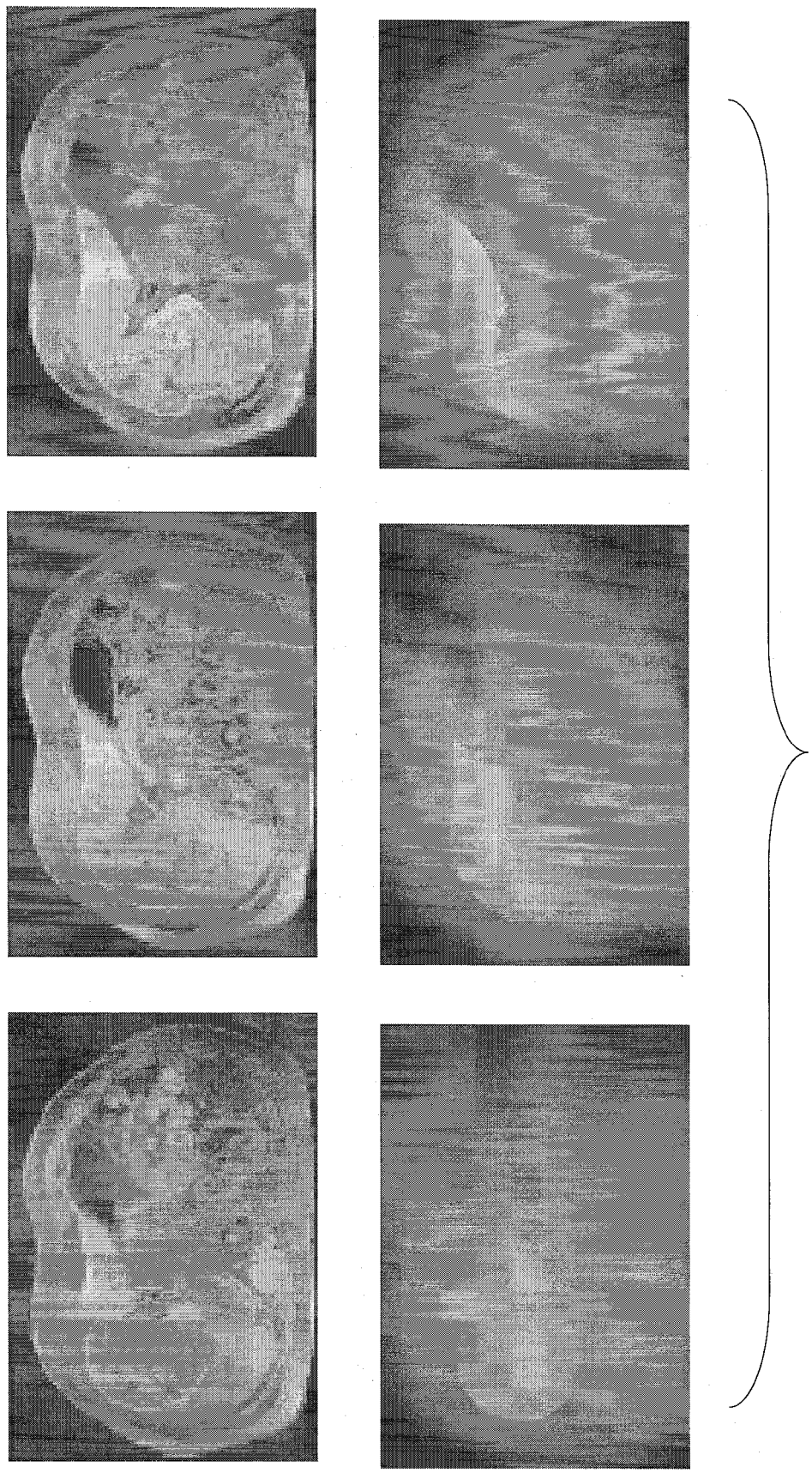
FIG. 11 illustrates a segmentation of an object in a medical image in accordance with an aspect of the present invention.

In FIGS. 10 and 11, both the model which is an aspect of the present invention in FIG. 11 and the Chan-Vese model in FIG. 10 are applied in order to extract a 2D liver from biased anatomical MRI. As the Chan-Vese model is not robust to bias, the liver is not correctly extracted, and the front "leak" in the part of the image where intensity is close to the global mean inside the front as can be seen in FIG. 10. One can see in FIG. 11 that the model which is an aspect of the present inventions behaves quite well, as the liver is correctly delimited at the local level. One just has to make the initial front cross the edges of the liver, and make the front evolve, thus following the edges of the liver, and finally extract it almost completely.

In conclusion, a new model was presented for extracting smooth regions from image data. This model is based on the Mumford-Shah functional, but is formulated in a simpler and more efficient way. A new functional was provided, and shown that it was linked to the Chan-Vese model, by representing regions as a local average instead of a global mean. One interesting point is that the minimization of this functional can be computed in a very fast way, thanks to the Deriche recursive filter. Promising results were provided on 2D synthetic and real data.

Derivation of Energy Equation

In an earlier section, an energy was defined that is composed of two domain integrals. Here, a detailed derivation is provided using shape gradients. The following energy is considered:

$$E(\Omega, \overline{\Omega}) = \int_\Omega f(x, \Omega) dx + \int_{\overline{\Omega}} f(x, \overline{\Omega}) dx,$$

where $$f(x, \Omega) = (u_0(x) - u_\sigma(x, \Omega))^2 = \left( u_0(x) - \frac{G_1(x, \Omega)}{G_2(x, \Omega)} \right)^2, \quad (10)$$

and $$\begin{cases} G_1(x, \Omega) = \int_\Omega H_1(x, y) dy \text{ and } H_1(x, y) = u_0(y) g_\sigma(x - y) \\ G_2(x, \Omega) = \int_\Omega H_2(x, y) dy \text{ and } H_2(x, y) = g_\sigma(x - y) \end{cases} \quad (11)$$

Recalling the main theorem of shape gradient method presented in "G. Aubert, M. Barlaud, 0. Faugeras, and S. Jehan-Besson. Image segmentation using active contours: Calculus of variations or shape gradients? *SIAM Journal of Applied Mathematics*, 63(6):2128-2154, 2003":

Theorem 1. The Gâteaux derivative of a functional $J(\Omega) = \int_\Omega g(x, \Omega) dx$ in the direction of a vector field V is:

$$\langle J'(\Omega), V \rangle = \int_\Omega g_s(x, \Omega, V) dx - \int_{\partial \Omega} g(x, \Omega)(V(x) \cdot N(x)) da(x),$$

where $g_s(x, \Omega, V)$ is the shape derivative of $g(x, \Omega)$ in the direction of V; $\partial \Omega$ is the boundary of $\Omega$; N is the unit inward normal to $\partial \Omega$; and da its area element.

In the present case, for the bi-partitioning problem, one has, $$\langle E'(\Omega, \overline{\Omega}), V \rangle = \int_\Omega f_s(x, \Omega, C) dx + \int_\Omega f_s(x, \overline{\Omega}, V) dx - \int_\Gamma (f(x, \Omega) - f(x, \overline{\Omega}))(V(x) \cdot N(x)) da(x)$$

with $$f_s(x, \Omega, V) = f_{G_1}(x, \Omega, G_1, G_2) \langle G'_1(x, \Omega) \cdot V \rangle + f_{G_2}(x, \Omega, G_1, G_2) \langle G'_2(x, \Omega) \cdot V \rangle,$$

where $f_{G_1}$ and $f_{G_2}$ denote the partial derivative of equation (10) with respect to $G_1$ and $G_2$. They can be expressed as:

$$\begin{cases} f_{G_1}(x, \Omega, G_1, G_2) = -\frac{2}{G_2(x, \Omega)} \left( I(x) - \frac{G_1(x, \Omega)}{G_2(x, \Omega)} \right) \\ f_{G_2}(x, \Omega, G_1, G_2) = -\frac{2G_1(x, \Omega)}{G_2(x, \Omega)^2} \left( I(x) - \frac{G_1(x, \Omega)}{G_2(x, \Omega)} \right) \end{cases} \quad (12)$$

and by using Theorem 1, $$\begin{cases} \langle G'_1(x, \Omega) \cdot V \rangle = \int_\Omega H_{1s}(x, y, V) dy - \int_\Gamma H_1(x, y)(V(y) \cdot N(y)) da(y) \\ \langle G'_2(x, \Omega) \cdot V \rangle = \int_\Omega H_{2s}(x, y, V) dy - \int_\Gamma H_2(x, y)(V(y) \cdot N(y)) da(y) \end{cases} \quad (13)$$

Since $H_1$ and $H_2$ do not depend on $\Omega$, one obtains $H_{1s}=0$ and $H_{2s}=0$. Putting all the terms together one finds:

$$f_s(x, \Omega, V) = f_{G_1} \langle G'_1 \cdot V \rangle + f_{G_2} \langle G'_2 \cdot V \rangle \quad (14)$$

$$= \frac{2(u_0(x) - u_\sigma(x, \Omega))}{\int_\Omega g_\sigma(x - y) dy} \quad (15)$$

$$\int_\Gamma g_\sigma(x-y) \binom{u_0(y) -}{u_\sigma(x, \Omega)} \binom{V(y) \cdot}{N(y)} da(y)$$

and at last one obtains by changing the order of integration, $$\langle E'(\Omega, \overline{\Omega}), V \rangle = \int_\Omega f_s(x, \Omega, V) dx + \int_\Omega f_s(x, \overline{\Omega}, V) dx - \quad (16)$$
$$\int_\Gamma (f(y, \Omega) - (f(y, \overline{\Omega}))(V(y) \cdot N(y)) da(y)$$
$$= \int_\Gamma \left( q(y, \Omega) - q(y, \overline{\Omega}) - \left( \frac{u_0(y) -}{u_\sigma(y, \Omega)} \right)^2 + (u_0(y) - u_\sigma(y, \overline{\Omega}))^2 \right)(V(y) \cdot N(y)) da(y)$$

with $$q(y, \Omega) = \int_\Omega \frac{2 \binom{u_0(x) -}{u_\sigma(x, \Omega)} g_\sigma(x-y) \binom{u_0(y) -}{u_\sigma(x, \Omega)}}{\int_\Omega g_\sigma(x - z) dz} dx$$

One finally gets the following gradient descent:

$$\frac{\partial \Gamma}{\partial t}(x) = \left[ (q(x, \Omega) - q(x, \overline{\Omega}) - (u_0(x) - u_\sigma(x, \Omega))^2 + (u_0(x) - u_\sigma(x, \overline{\Omega}))^2 \right] N(x) \quad (17)$$

Implementation

Each integral term in the gradient descent can be seen as a convolution by a kernel of variance σ. Therefore, the computation of the evolution can be done in a very fast way in two separate steps:
  first: make several convolutions via a fast recursive filter (ref deriche)
  next: compute the speed of each point in the narrow-band by using the previously computed blurred images.

One has, $$u(x, \Omega) = \frac{\int_\Omega g_\sigma(x-y) u_0(y) dy}{\int_\Omega g_\sigma(x-y) dy} = \frac{(g_\sigma * u_0)|_\Omega (x)}{(g_\sigma * 1)|_\Omega (x)} \quad (18)$$

and $$q(y, \Omega) = \int_\Omega \frac{2(u_0(x) - u_\sigma(x, \Omega)) g_\sigma(x-y)(u_0(y) - u_\sigma(x, \Omega))}{\int_\Omega g_\sigma(x - z) dz}$$
$$= u_0(y) \int_\Omega \frac{2(u_0(x) - u_\sigma(x, \Omega))}{(g_\sigma * 1)|_\Omega (x)} g_\sigma(x-y) dx -$$
$$\int_\Omega \frac{2(u_0(x) - u_\sigma(x, \Omega)) u_\sigma(x, \Omega)}{(g_\sigma * 1)|_\Omega (x)} g_\sigma(x-y) dx$$
$$= u_0(y)(g_\sigma * q_1|_\Omega)(y) - (g_\sigma * q_2)|_\Omega (y)$$

with $$q1(x, \Omega) = \frac{2(u_0(x) - u_\sigma(x, \Omega))}{(g_\sigma * 1)|_\Omega (x)} \quad (19)$$

and $$q2(x, \Omega) = \frac{2(u_0(x) - u_\sigma(x, \Omega)) u_\sigma(x, \Omega)}{(g_\sigma * 1)|_\Omega (x)}$$

The domain convolution can be computed by using the Heaviside $H_\sigma$ of the level-set function:

$$\begin{cases} (g_\sigma * f)|_\Omega (x) = (g_\sigma * H_\sigma f)(x) \\ (g_\sigma * f)|_{\overline{\Omega}} (x) = (g_\sigma * (1 - H_\sigma) f)(x) \end{cases} \quad (20)$$

System

Figure 12:
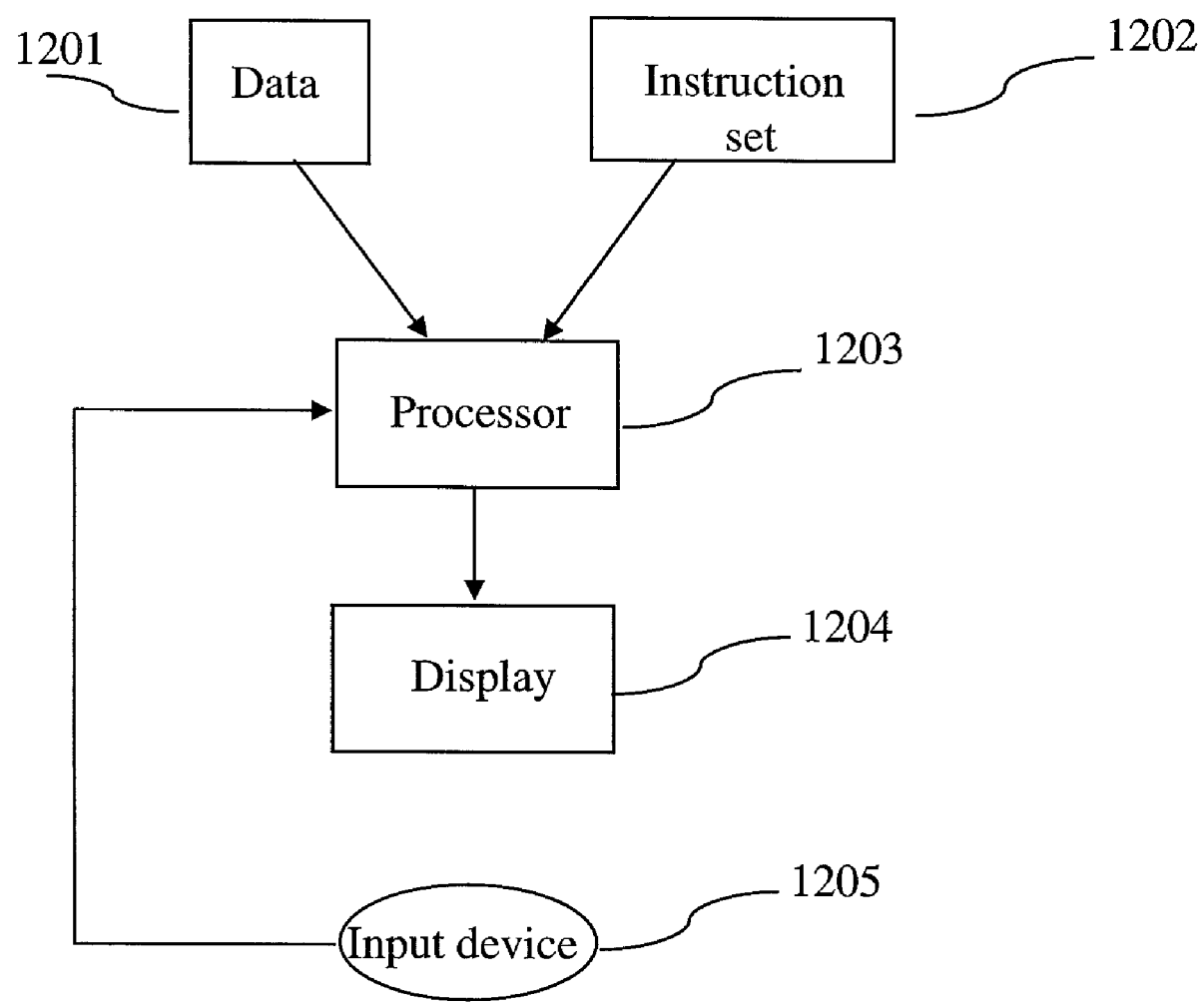
FIG. 12 illustrates a computer system that is used to perform the steps described herein in accordance with another aspect of the present invention.

The segmentation methods that are aspects of the present invention can be executed by a system as shown in FIG. 12. The system is provided with data 1201 representing image data. An instruction set or program 1202 executing the methods of the present invention is provided and combined with the data in a processor 1203, which can process the instructions of 1202 applied to the data 1201. A segmented image can be outputted and for instance displayed on a display 1204. The processor can be dedicated hardware. However, the processor can also be a CPU or any other computing device that can execute the instructions of 1202. An input device 1205 like a mouse, or track-ball or other input device allows a user to select an initial object to be segmented and to start the segmenting process. Accordingly the system as shown in FIG. 12 provides a system for efficient image segmentation using methods disclosed herein.

The following references are generally descriptive of the background of the present invention and are hereby incorporated herein by reference: [1]. G. Aubert, M. Barlaud, 0. Faugeras, and S. Jehan-Besson. Image segmentation using active contours: Calculus of variations or shape gradients? *SIAM Journal of Applied Mathematics,* 63(6):2128-2154, 2003. [2]. V. Caselles, R. Kimmel, and G. Sapiro. Geodesic active contours. *International Journal of Computer Vision,* Vol 22:61-79, 1997. [3]. D. Cremers, M. Rousson, and R. Deriche. A review of statistical approaches to level set segmentation: integrating color, texture, motion and shape. *International Journal of Computer Vision,* 2006. [4]. R. Deriche. Using Canny's criteria to derive a recursively implemented optimal edge detector. *The International Journal of Computer Vision,* 1(2):167-187, May 1987. [5]. A. Dervieux and F. Thomasset. A finite element method for the simulation of Raleigh-Taylor instability. *Springer Lect. Notes in Math.,* 771:145-158, 1979. [6]. 0. Juan, R. Keriven, and G. Postelnicu. Stochastic motion and the level set method in computer vision: Stochastic active contours. *The International Journal of Computer Vision,* 69(1):7-25, 2006. [7]. S. Kichenassamy, A. Kumar, P. Olver, A. Tannenbaum, and A. Yezzi. Gradient flows and geometric active contour models. In *Proceedings of the 5th International Conference on Computer Vision,* pages 810-815, Boston, Mass., June 1995. IEEE Computer Society Press. [8]. J. Kim, J. Fisher, A. Yezzi, M. Cetin, and A. Willsky. Nonparametric methods for image segmentation using information theory and curve evolution. In *IEEE International Conference on Image Processing,* pages 797-800, September 2002. [9]. D. Mumford and J. Shah. Optimal approximations by piecewise smooth functions and associated variational problems. *Comm. Pure Appl. Math.,* 42: 577-685, 1989. [10]. S. Osher and J. Sethian. Fronts propagation with curvature dependent speed: Algorithms based on Hamilton-Jacobi formulations. *J. of Comp. Phys.,* 79:12-49, 1988. [11]. N. Paragios and R. Deriche. Geodesic active regions and level set methods for supervised texture segmentation. *The International Journal of Computer Vision,* 46(3):223-247, 2002. [12]. M. Rousson and R. Deriche. A variational framework for active and adaptative segmentation of vector valued images. In *Proc. IEEE Workshop on Motion and Video Computing,* pages 56-62, Orlando, Fla., December 2002. [13]. J. Sethian. *Level Set Methods and Fast Marching Methods: Evolving Interfaces in Computational Geometry, Fluid Mechanics, Computer Vision, and Materials Sciences.* Cambridge Monograph on Applied and Computational Mathematics. Cambridge University Press, 1999. [14]. A. Tsai, A. Jr. Yezzi, and A. S. Willsky. Curve evolution implementation of the mumford-shah functional for image segmentation, denoising, interpolation, and magnification. *IEEE Transactions on Image Processing,* 10(8):1169-1186, August 2001. [15]. L. Vese. Multiphase object detection and image segmentation. In S. Osher and N. Paragios, editors, *Geometric Level Set Methods in Imaging, Vision and Graphics,* pages 175-194. Springer Verlag, 2003. [16]. L. Vese and T. Chan. A multiphase level set framework for image segmentation using the mumford and shah model. *International Journal of Computer Vision,* 50:271-293, 2002.

The terms voxel and voxels used herein are also intended to mean pixel or pixels in the appropriate situations.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of segmentation of an image $u_0$ comprising:
utilizing a processor to create a plurality of smooth regions $\Omega_i$ delimited by a boundary $\Gamma$;
approximating the image by a piecewise smooth function $u_\sigma$ inside each region $\Omega_i$; and
evaluating a functional, wherein the piecewise smooth function is expressed as:

$$u_\sigma(x, \Omega_i) = \frac{\int_{\Omega_i} g_\sigma(x-y) u_0(y) dy}{\int_{\Omega_i} g_\sigma(x-y) dy}, \quad \text{wherein } g_\sigma(v) = \frac{1}{\sqrt{2\pi}\sigma} \exp\left(-\frac{v^2}{2\sigma^2}\right)$$

is a Gaussian kernel.

2. The method as claimed in claim 1, wherein the functional is evaluated in a level set implementation.

3. The method as claimed in claim 1, wherein the functional is expressed as $$E(\Gamma) = \mu^2 \int_S (u_0 - u_\sigma(\Gamma))^2 dx + v|\Gamma|.$$

4. The method as claimed in claim 1, wherein the functional is expressed as $$E(\Gamma) = \mu^2 \sum_i \int_{\Omega_i} (u_0 - u_\sigma(\Omega_i))^2 dx + v|\Gamma|.$$

5. The method as claimed in claim 1, wherein $u_\sigma$ represents an overall piecewise smooth approximation expressed as $$u_\sigma(x, \Gamma) = \sum_i \chi_i u_\sigma(x, \Omega_i).$$

6. The method as claimed in claim 1, wherein a performance of segmentation can be tuned by selecting a value of $\sigma$.

7. The method as claimed in claim 1, wherein the segmentation is a bi-partitioning, separating a region $\Omega$ from a complementary region $\overline{\Omega}$.

8. The method as claimed in claim 7, further comprising:
evolving the boundary $\Gamma$ between region $\Omega$ and region $\overline{\Omega}$ according to an expression $$\frac{\partial \Gamma}{\partial t}(x) = [$$
$$\mu^2\left((u_0(x) - u_\sigma(x, \overline{\Omega}))^2 - (u_0(x) - u_\sigma(x, \Omega))^2 - q_\sigma(x, \overline{\Omega}) + q_\sigma(x, \Omega)\right) +$$
$$v\kappa]N(x).$$

9. The method as claimed in claim 8, further comprising:
implementing the evolving of the boundary $\Gamma$ with a level set representation.

10. The method as claimed in claim 9, further comprising:
computing steps of the evolving of the boundary $\Gamma$ with a recursive filter.

11. A system of segmentation of an image $u_0$ comprising:
a processor;
software operable on the processor to:

creating a plurality of smooth regions $\Omega_i$ delimited by a boundary $\Gamma$;

approximating the image by a piecewise smooth function $u_\sigma$ inside each region $\Omega_i$; and evaluating a functional, wherein the piecewise smooth function is expressed as:

$$u_\sigma(x, \Omega_i) = \frac{\int_{\Omega_i} g_\sigma(x-y) u_0(y) dy}{\int_{\Omega_i} g_\sigma(x-y) dy}, \quad \text{wherein } g_\sigma(v) = \frac{1}{\sqrt{2\pi}\sigma} \exp\left(-\frac{v^2}{2\sigma^2}\right)$$

is a Gaussian kernel.

12. The system as claimed in claim 11, wherein the functional is evaluated in a level set implementation.

13. The system as claimed in claim 11, wherein the functional is expressed as $$E(\Gamma) = \mu^2 \int_S (u_0 - u_\sigma(\Gamma))^2 dx + v|\Gamma|.$$

14. The system as claimed in claim 11, wherein the functional is expressed as $$E(\Gamma) = \mu^2 \sum_i \int_{\Omega_i} (u_0 - u_0(\Omega_i))^2 dx + v|\Gamma|.$$

15. The system as claimed in claim 11, wherein $u_\sigma$ represents an overall piecewise smooth approximation expressed as $$u_\sigma(x, \Gamma) = \sum_i \chi_i u_\sigma(x, \Omega_i).$$

16. The system as claimed in claim 12, wherein a performance of segmentation can be tuned by selecting a value of $\sigma$.

17. The system as claimed in claim 11, wherein the segmentation is a bi-partitioning, separating a region $\Omega$ from a complementary region $\overline{\Omega}$.

18. The system as claimed in claim 17, further comprising:

evolving the boundary $\Gamma$ between region $\Omega$ and region $\overline{\Omega}$ according to an expression $$\frac{\partial \Gamma}{\partial t}(x) = \left[\mu^2\left((u_0(x) - u_\sigma(x, \overline{\Omega}))^2 - (u_0(x) - u_\sigma(x, \Omega))^2 - q_\sigma(x, \overline{\Omega}) + q_\sigma(x, \Omega)\right) + v\kappa\right] N(x).$$

19. The system as claimed in claim 18, further comprising:

implementing the evolving of the boundary $\Gamma$ with a level set representation.

20. The system as claimed in claim 19, further comprising:

computing steps of the evolving of the boundary $\Gamma$ with a recursive filter.

* * * * *